(12) United States Patent
Chowdhury et al.

(10) Patent No.: US 8,498,391 B2
(45) Date of Patent: Jul. 30, 2013

(54) METHODS, SYSTEMS AND PROGRAM PRODUCTS FOR SUPPORTING PREPAID SERVICE WITHIN A COMMUNICATION NETWORK

(75) Inventors: Kuntal Chowdhury, Plano, TX (US); Guy Helm, Plano, TX (US); Peter Wenzel, Plano, TX (US)

(73) Assignee: Apple Inc., Cupertino, CA (US)

( * ) Notice: Subject to any disclaimer, the term of this patent is extended or adjusted under 35 U.S.C. 154(b) by 3568 days.

(21) Appl. No.: 10/307,637

(22) Filed: Dec. 2, 2002

(65) Prior Publication Data

US 2004/0106393 A1 Jun. 3, 2004

(51) Int. Cl.
*H04M 15/00* (2006.01)
*H04M 11/00* (2006.01)

(52) U.S. Cl.
USPC ..................................... 379/114.17; 455/405

(58) Field of Classification Search
USPC ............. 705/1, 52, 29, 400, 1.1, 26.1, 28–35, 705/68, 77, 412; 455/406, 405; 709/203, 709/226, 225; 379/114.17, 114.15, 114.01, 379/114.02, 114.28
See application file for complete search history.

(56) References Cited

U.S. PATENT DOCUMENTS

| 6,373,930 | B1 * | 4/2002 | McConnell et al. ..... 379/114.28 |
| 6,999,449 | B2 * | 2/2006 | Barna et al. ................... 370/352 |
| 2002/0116338 | A1 * | 8/2002 | Gonthier et al. ................ 705/52 |
| 2007/0106569 | A1 * | 5/2007 | McQuaide et al. ............. 705/26 |

OTHER PUBLICATIONS

Rigney, et al., "Remote Authentication Dial In User Service (RADIUS)", Jun. 2000, RFC 2865, The Internet Society, Standards Track.
Rigney, et al., "RADIUS Accounting", Jun. 2000, RFC 2866, The Internet Society, Standards Track.
"Wireless IP Network Standard", 3rd Generation Partnership Project 2 "3GPP2", 3GPP2 P.S0001-A, Version 3.0, Jul. 16, 2001.

\* cited by examiner

*Primary Examiner* — Igor Borissov
(74) *Attorney, Agent, or Firm* — Meyertons, Hood, Kivlin, Kowert & Goetzel, P.C.

(57) ABSTRACT

According to a method of controlling access to a prepaid packet data communication service, a prepaid server transmits a resource response in response to receipt of a resource request for prepaid resources from a prepaid client. The resource response specifies a quota of prepaid resources no greater than a prepaid account balance of a prepaid service subscriber and a resource usage threshold at which the prepaid client provides notification. The prepaid client then receives a notification from the prepaid client indicating that the threshold of prepaid resources has been reached, and in response to the notification, performs an accounting updating reflecting a portion of the prepaid account balance that has been consumed.

21 Claims, 8 Drawing Sheets

| 0 1 2 3 4 5 6 7 8 9 0 1 2 3 4 5 6 7 8 9 0 1 2 3 4 5 6 7 8 9 0 1 |||||
|---|---|---|---|---|
| Type=26 | Length=12 | Vendor-ID=5535 |||
| Vendor-ID (cont) || Vendor-Type | Vendor-Length=6 |
| Sub Type =1 | Length=4 | Vendor-Value ||

FIG. 3

| 0 1 2 3 4 5 6 7 8 9 | 0 1 2 3 4 5 6 7 8 9 | 0 1 2 3 4 5 6 7 8 9 | 0 1 |
|---|---|---|---|
| Type=26 | Length=24 | Vendor-ID=5535 | |
| Vendor-ID (cont) | Vendor-Type | Vendor-Length=18 | |
| Subtype=1 | Length=4 | Quota-ID | |
| Subtype=2 | Length=6 | Volume Threshold Octets | |
| Volume Threshold Octets | | | |
| Allocated Volume Quota Octets | | | |
| Subtype=3 | Length=6 | Duration Threshold (Seconds) | |
| Duration Threshold (seconds) | | | |
| Subtype=4 | Length=6 | Subtype=5 | Length=6 |
| Duration Threshold (seconds) | | | |
| Allocated Duration Quota (seconds) | | | |

FIG. 4

| 0 1 2 3 4 5 6 7 | 8 9 0 1 2 3 4 5 | 6 7 8 9 0 1 2 3 | 4 5 6 7 8 9 0 1 |
|---|---|---|---|
| Type=26 | Length=16 | Vendor-ID=5535 ||
| Vendor-ID (cont) || Vendor-Type=71 | Vendor-Length=20 |
| Subtype=1 | Length | Remote Address Table Index ||
| Remote Address Table Index | Subtype=1 | Length |
| Qualifier | Unused |||

FIG. 5

| 0 1 2 3 4 5 6 7 | 8 9 0 1 2 3 4 5 | 6 7 8 9 0 1 2 3 4 5 | 6 7 8 9 0 1 |
|---|---|---|---|
| 0 | 1 | 2 | 3 |
| Type=26 | Length=20 | Vendor-ID=5535 | |
| Vendor-ID (cont) | | Vendor-Type=59 | Vendor-Length=14 |
| Subtype=1 | Length=6 | Value (Remote IPv4 address) | |
| Value (Remote IPv4 address) | | Subtype=2 | Length=6 |
| Value (remote IPv4 address mask) | | | |
| Subtype=3 | Length | Qualifier | |

FIG. 6

| 0 1 2 3 4 5 6 7 8 9 0 1 2 3 4 5 6 7 8 9 0 1 2 3 4 5 6 7 8 9 0 1 |
|---|
| Type=26 | Length=32 | Vendor-ID=5535 |
| Vendor-ID (cont) | Vendor-Type=70 | Vendor-Length=26 |
| Subtype=1 | Length=18 | Value (Remote IPv6 address) |
| Value (Remote IPv6 address) |
| Value (Remote IPv6 address) |
| Value (Remote IPv6 address) |
| Value (Remote IPv6 address) | Subtype=2 | Length=4 |
| Value (Prefix length) | Qualifier |
| Subtype=3 | Length |

FIG. 7

METHODS, SYSTEMS AND PROGRAM PRODUCTS FOR SUPPORTING PREPAID SERVICE WITHIN A COMMUNICATION NETWORK

BACKGROUND OF THE INVENTION

1. Technical Field

The present invention relates in general to data communication and in particular to prepaid packet data service within a data communication network, such as a wireless packet data network.

2. Description of the Related Art

In 2000, the International Telecommunications Union (ITU) released the technical specifications for third generation (3G) International Mobile Teleconumunications (IMT) technology under the brand IMT-2000, commonly referred to simply as 3G. 3G has a number of benefits over second generation (2G) technology, including increased transmission rates (e.g., a minimum speed of 2 Mbit/s for stationary users and 348 kbit/s in a moving vehicle versus 2G speeds ranging from 9.6 kbit/s to 28.8 kbit/s), support for the three predominant access technologies (Frequency Division Multiple Access (FDMA), Time Division Multiple Access (TDMA) and Code Division Multiple Access (CDMA)), and support for a wide range of value-added services such as wireless Internet access, wireless Virtual Private Networks (VPNs), personalized content delivery (news, stock quotes, etc.), entertainment, and video conferencing.

The present invention provides a prepaid packet data service within 3G wireless (and landline) data communication networks that employs efficient accounting and resource allocation methodologies.

SUMMARY OF THE INVENTION

In one aspect, the present invention provides a method of controlling access to a prepaid packet data communication service. According to the method, a prepaid server transmits a resource response in response to receipt of a resource request for prepaid resources from a prepaid client. The resource response specifies a quota of prepaid resources no greater than a prepaid account balance of a prepaid service subscriber and a resource usage threshold at which the prepaid client provides notification. The prepaid client then receives a notification from the prepaid client indicating that the threshold of prepaid resources has been reached, and in response to the notification, performs an accounting update reflecting a portion of the prepaid account balance that has been consumed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 illustrates an exemplary RADIUS Prepaid Capability Vendor-Specific Attribute (VSA) in accordance with one embodiment of the present invention;

FIG. 4 depicts an exemplary RADIUS Quota Update VSA in accordance with one embodiment of the present invention;

FIG. 5 depicts an exemplary enhanced RADIUS Remote Address Table Index attribute in accordance with one embodiment of the present invention;

FIG. 6 illustrates an exemplary enhanced RADIUS Remote IPv4 Address attribute in accordance with one embodiment of the present invention; and FIG. 7 depicts an exemplary RADIUS Remote IPv6 Address attribute in accordance with one embodiment of the present invention.

In the figures, like reference numbers generally indicate identical, functionally similar, and/or structurally similar elements.

DETAILED DESCRIPTION OF A PREFERRED EMBODIMENT

Figure 1:
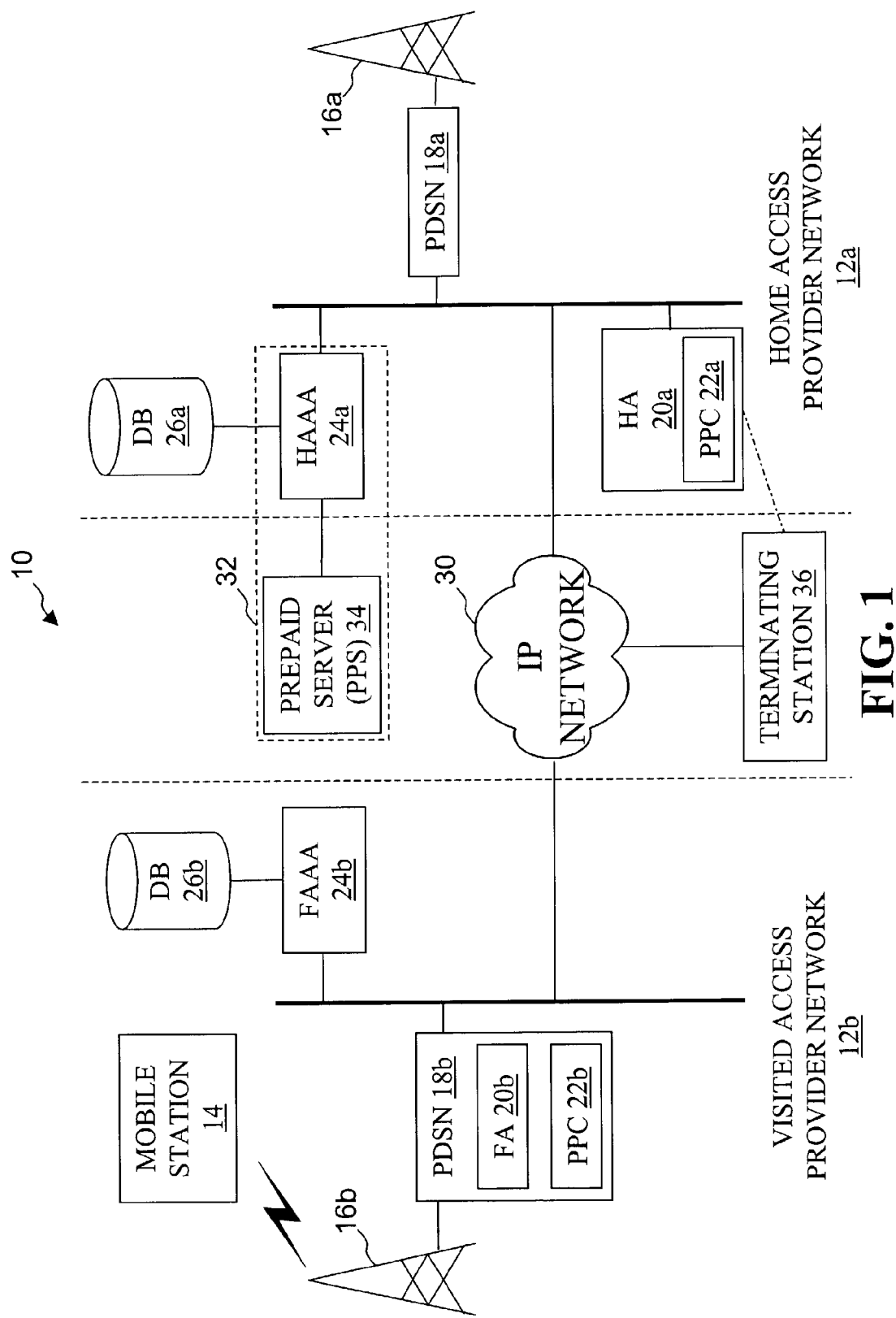
FIG. 1 is a high level block diagram of a packet data communication network in accordance with the present invention.

With reference now to the figures and in particular with reference to FIG. 1, there is depicted an exemplary data communication network 10 that supports prepaid packet data service in accordance with the present invention. In the depicted embodiment, data communication network 10 includes at least a home access provider network 12a supporting over-the-air (i.e., wireless) radio communication with mobile stations, such as mobile station (mobile node) 14. In accordance with the present invention, the subscriber associated with mobile station 14 subscribes to prepaid packet data service from the network service provider of home access provider network 12a and purchases packet data service in advance of use based upon data volume or duration.

As illustrated, home access provider network 12a may include a plurality of base stations 16a (only one of which is illustrated) coupled to one or more Packet Data-Serving Nodes (PDSNs) 18. Each PDSN 18 is a network access server through which mobile stations connect to a packet data network, such as Internet Protocol (IP) network 30 (e.g., the Internet or Local Area Network (LAN)). Home access provider network 12a further includes a Home Agent (HA) 20a, which is a router that maintains the network identity (e.g., IP address) of subscribers' mobile stations, tunnels datagrams for delivery to the mobile stations when roaming, and maintains current location information for the mobile stations.

Home access provider network also includes a Home Authentication, Authorization and Accounting (HAAA) server 24a having an associated database (DB) 26a. As its name implies, HAAA server 24a performs authentication, authorization and accounting for packet data service, including prepaid packet data service. HAAA server 24a authenticates subscribers attempting to gain access to packet data service by comparing the subscriber's credentials (e.g., one or more of a Network Access Identifier (NAI), handset serial number, username, and password) with those within a corresponding entry within database 26a. For subscribers that gain access to packet data services, HAAA server 24a determines, delivers, and enforces a selected or predetermined level of service by (1) authorizing the user to access certain network resources and setting restrictions (i.e., time-of-day, data bandwidth, data volume, session duration, timeout lengths, etc.) and (2) sending connection information to other devices on the network. HAAA server 24a also records subscribers' network access activity within database 26a for billing purposes. In one embodiment, HAAA server 24a implements the Remote Authentication Dial-In User Service (RADIUS) protocol for AAA communication described in Internet Engineering Task Force (IETF) Request for Comment (RFC) 2865 and 2866. These RFCs are hereby incorporated by reference in their entireties.

As further illustrated in FIG. 1, data communication network 10 may include not only home access provider network 12a, but may further include one or more visited (or foreign) access provider networks 12b coupled to home access provider network 12a by IP network 30. As indicated by like reference numerals, visited access provider networks 12b have generally similar constructions to home access provider network 12a and include one or more base stations 16b, PDSN(s) 18b, a Foreign Agent (FA) 20b, and a foreign AAA (FAAA) 24b. FA 20b is a routing function that provides routing services to mobile station 14 while registered and detunnels and delivers datagrams to mobile station 14 that were tunneled by HA 20a. As illustrated, in some instances, for example, in 3G wireless networks complying with Telecommunications Industry Association (TIA) TIA/IS-835-B, entitled "cdma2000 Wireless IP Network Standard," the PDSN 18b includes the FA 20b functionality. FAAA 24b forwards requests by PDSN 18b to the appropriate HAAA server 24a within the subscriber's home access provider network based on the subscriber's Network Access Identifier (NAI) or other means.

The present invention supports prepaid packet data service with a client-server architecture including at least one PrePaid Client (PPC) 22 that requests prepaid packet data services on behalf of a mobile station 14 and at least one PrePaid Server (PPS) 34 that controls provision of prepaid packet data services to mobile stations 14. PPS 34 and PPCs 22 may be implemented in hardware, software, firmware or a combination. As illustrated, PPCs 22 may be conveniently implemented in network access points, such as PDSN/FA 18 or HA 20. PPS 34 may either be collocated with HAAA server 24a or be implemented entirely separately from HAAA server 24a. Regardless of the selected implementation of PPS 34, PPS 34 and HAAA server 24a cooperate to provide prepaid packet data services to mobile stations subject to the authentication, authorization and accounting functions of HAAA server 24a. Consequently, for simplicity, PPS 34 and HAAA 24a are at times collectively illustrated and referenced herein as HAAA/PPS 32.

Generally speaking, a subscriber wishing to utilize a prepaid packet data service first purchases an account balance (of duration or data volume) from PPS 34 of the subscriber's home access provider network 12. The subscriber may purchase the account balance, for example, by providing a credit card number and charge authorization to PPS 34 via an IPsec connection over the Internet. When PPS 34 later receives a request to utilize the prepaid packet data services from a PPC 22, PPS 34 (following AAA operations by HAAA 24a) allocates a quota (of time or volume) from the account balance to the PPC 22. The allocated quota preferably varies based upon the remaining unallocated account balance with PPS 34. For example, if the subscriber has a large account balance, PPS 34 allocates a large quota, and when the unallocated account balance falls below a first threshold, the quota allocated in response to each subsequent quota request is reduced. This first threshold is preferably no less than the quota allocated when the account balance is above the threshold. For example, if PPS 34 normally allocates 50 KB data volume quotas, when the subscriber's available account balance drops to 50 KB, PPS 34 should reduce future quotas, for example, to 10 KB. The quota and threshold values are preferably configurable at PPS 34 by the service provider.

As is known to those skilled in the art, the subscriber associated with mobile station 14 can subscribe to at least two levels of packet data service provided by home access provider network 12a—Simple IP and Mobile IP. Prepaid packet data service in accordance with the present invention supports both of these service levels. As described in detail in TIA/IS-835-B, which is incorporated herein by reference in its entirety, Simple IP provides a low level of IP address mobility that permits a mobile station 14 to retain the same IP address while roaming among multiple cells connected to the same PDSN 18.

Mobile IP, by contrast, maintains the same IP address for a mobile station 14 for the duration of a session even when the mobile station 14 roams among cells supported by different PDSNs/FAs 18. In Mobile IP, when a mobile station 14 connects to data communication network 14 via an arbitrary PDSN 18, the FA 20b of the visited access provider network 12b contacts HA 20a of the subscribers' home access provider network 12a and establishes a tunnel between FA 20b and HA 20a across IP network 30 to carry packet data traffic. Mobile station 14 is assigned an IP address that is maintained by HA 20a. Because HA 20a maintains the IP address for mobile station 14, as mobile station 14 roams among cells connected to new PDSNs 18 and new tunnels are established to the same HA 20a by the associated FAs 20b, HA 20a is able to maintain the same IP address for mobile station 14 for the duration of the session and simply route the traffic destined for the mobile station 14 to the current FA 20b via the tunnel.

Figure 2A:
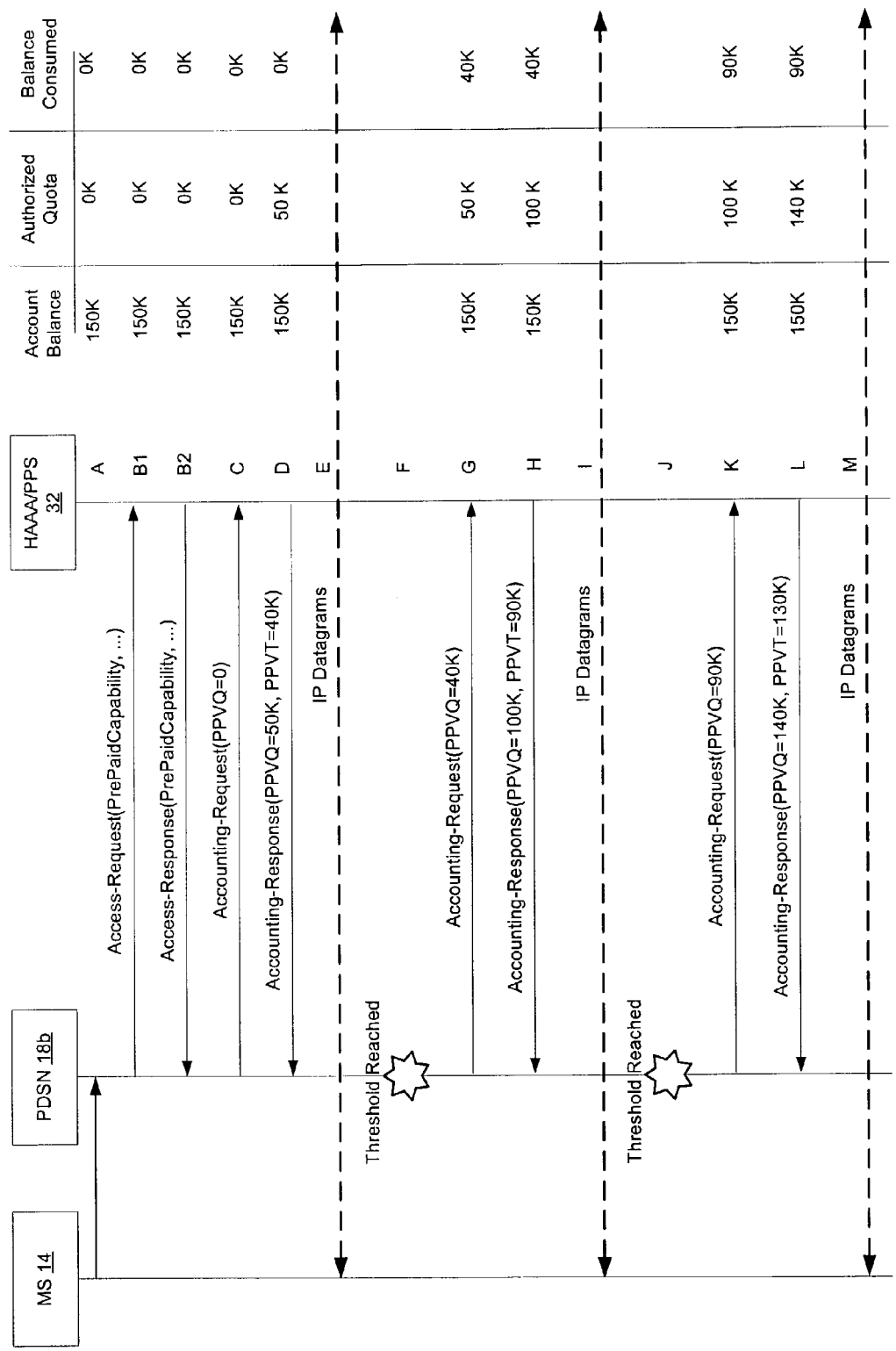
FIGS. 2A and 2B together form a time-space diagram illustrating an exemplary prepaid data communication scenario in accordance with the present invention.
Figure 2B:
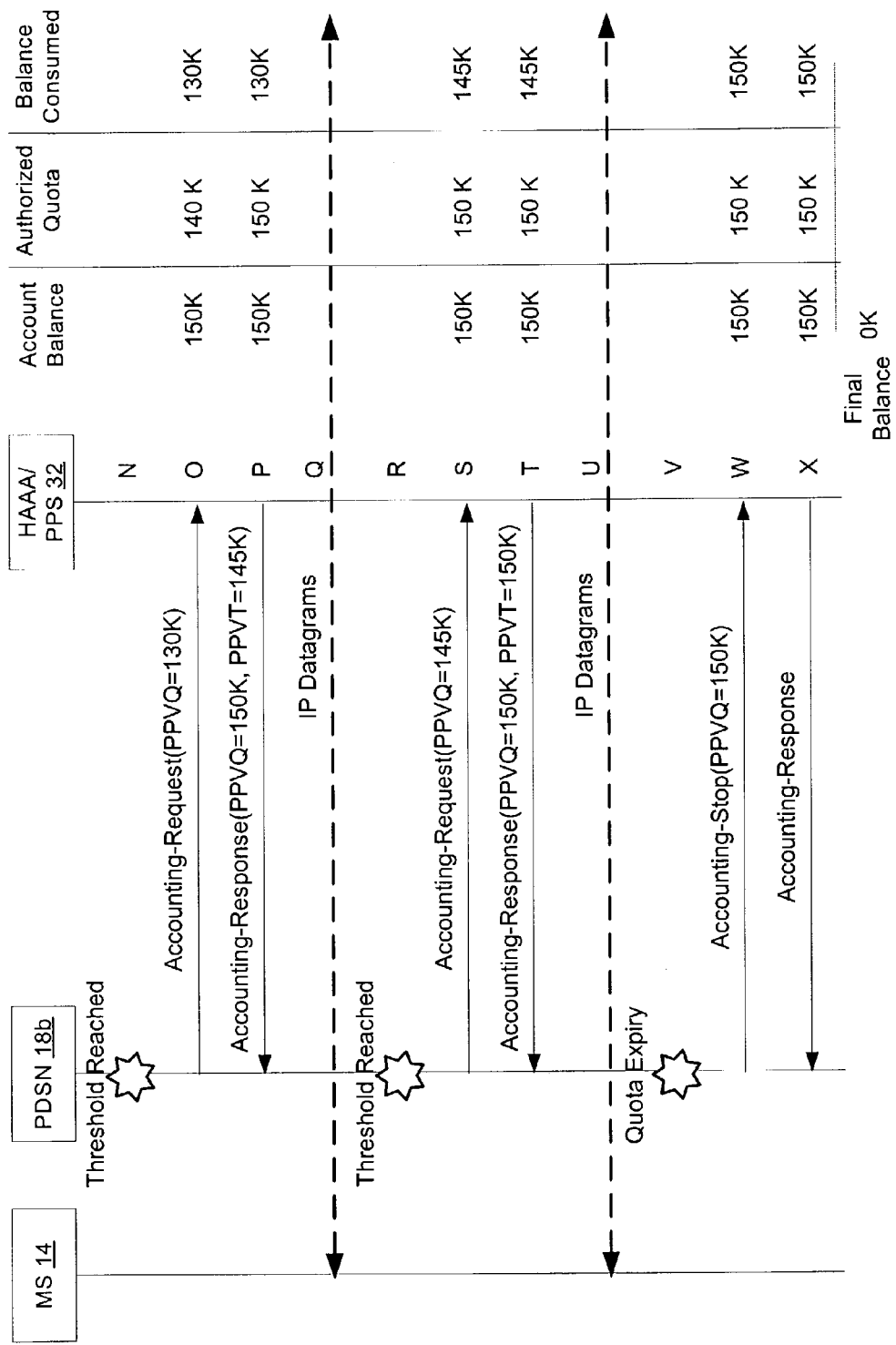

Referring now to FIGS. 2A-2B, a time-space diagram of an exemplary prepaid packet data session in accordance with the present invention is depicted. In FIGS. 2A-2B, chronologically earlier times are represented at the top of the diagrams, and the indicated times chronologically advance in alphabetical order. The depicted communication scenario is applicable to both Simple IP and Mobile IP service levels.

As shown, the process begins in FIG. 2A at time A, which illustrates mobile station 14 establishing over-the-air radio communication with PDSN 18b via base station 16b and requesting a prepaid packet data session. As indicated, it is assumed that the subscriber has already purchased a data volume account balance of 150 KB.

Next, as illustrated at time B1, PDSN 18b responds to the Simple IP or Mobile IP session request by sending an Access-Request message to HAAA/PPS 32. (In general, the Access-Request is first sent to FAAA 24b and then forwarded to HAAA/PPS 32 based upon NAI or other home network identifier.) The Access-Request message includes a PrePaid Capability attribute, which in some embodiments may take the form of the RADIUS PrePaid Capability Vendor Specific Attribute (VSA) illustrated in FIG. 3 and described below. In response to the Access-Request message, HAAA 24a performs regular subscriber authentication/authorization, and because the Access-Request includes a PrePaid Capability attribute indicating that PDSN 18b can support prepaid packet data service, PPS 32 also performs prepaid service validation. If the prepaid service validation succeeds, HAAA/PPS 32 returns to PDSN 18b (via FAAA 24b) an Access-Accept message (shown at time B2) including a PrePaid Capability attribute (which again may be in the form illustrated in FIG. 3), indicating that prepaid accounting will be utilized for the packet data session.

As discussed below with reference to FIG. 3, the PrePaid Capability attribute appended to the Access-Response preferably indicates whether HAAA/PPS 32 confirms PDSN 18b as the prepaid client (PPC) for the session. If not, PPS 34 preferably assigns another device to serve as the PPC for the session, for example, PPC 22a within HA 20a. If, however, PDSN 18*b* is confirmed by the Access-Response as the PPC for the session, PPC 22*b* within PDSN 18*b* becomes the PPC for the session and exchanges quota allocation and quota update messages with PPS 34 until termination of the session or until a mobility event causes the session to be transferred to another PDSN 18*b*.

The Access-Response shown at time B2 (or other selected messages) may include or be appended with further attributes that govern accounting or other aspects of the prepaid packet data service. For example, as discussed below with reference to FIGS. 5-7, such attributes may include attributes identifying destination station(s) exempt from prepaid charges (i.e., bytes count or time utilized in a session with the destination station(s) are not deducted from the prepaid account balance).

At time C, PDSN 18*b* sends to PPS 34 an Accounting-Request message requesting the allocation of a PrePaid Volume Quota (PPVQ) for the prepaid packet data session. The Accounting-Request, which is preferably a RADIUS Accounting-Request (Interim) message, includes a Quota Update attribute in which the PrePaid Volume Quota (PPVQ) is initialized to zero. PDSN 18*b* does not permit any data to flow in the packet data session until PDSN 18*b* receives a non-zero PPVQ from PPS 34. In some embodiments, the Quota Update attribute may take the form of the RADIUS Quota VSA illustrated in FIG. 4 and described below. It should also be noted that in some embodiments of the present invention the Quota Update attribute may be a part of or appended to another message, such as the Access-Request message. In response to the Accounting-Request by PDSN 18*b*, PPS 34 returns to PDSN 18*b* an Accounting-Response message at time D. The Accounting-Response message includes a Quota Update attribute specifying a PPVQ of 50K and a PrePaid Volume Threshold (PPVT) of 40K, indicating that 50 KB of data is authorized to be transmitted in the packet data session and PPC 22*b* should update PPS 34 after 40 KB of traffic has been communicated. As indicated, PPS 34 saves the 50K PPVQ as an Authorized Quota value.

Thereafter, as depicted at time E, IP data flows between mobile station 14 and terminating station 36 across IP network 30, and all non-exempt data bytes communicated in the session are counted by PPC 22*b* of PDSN 18*b*. Of course, if PPC 22*a* of HA 20*a* is designated by PPS 34 to serve as the PPC for the prepaid packet data session, the traffic flows between PDSN 18*b* and HA 20 via a reverse tunnel over IP network 30 and then from HA 20*a* to terminating station 36 so that PPC 22*a* can count the data bytes (or session duration) consumed from the allocated quota.

In response to detecting that the 40 KB PPVT has been reached at time F, PDSN 18*b* sends an Accounting-Request message (e.g., a RADIUS Accounting-Request (Interim) message) to PPS 34 at time G, where the Accounting-Request message has a Quota Update attribute specifying PPVQ=40 KB. In response to receipt of the Accounting-Request message, PPS 34 saves 40 KB as the Balance Consumed and determines that the difference between the Account Balance and Authorized Quota is 100 KB. Accordingly, PPS 34 authorizes an additional 50 KB quota and at time H transmits to PDSN 18*b* an Accounting-Response message having a Quota Update attribute specifying a PPVQ of 100 KB (the cumulative quota) and a PPVT of 90 KB (the cumulative threshold).

As shown at time I, IP data flow between mobile station 14 and terminating station 36 continues. The IP data flow continues until PPC 22*b* within PDSN 18*b* detects that the PPVT of 90 KB is reached at time J. In response to detecting that the 90 KB PPVT has been reached at time J, PDSN 18*b* sends an Accounting-Request message to PPS 34 at time K, informing PPS 34 that 90 KB of traffic has been detected with a Quota Update attribute specifying PPVQ=90 KB. In response to receipt of the Accounting-Request message, PPS 34 saves 90 KB as the Balance Consumed and determines that the difference between the Account Balance and Authorized Quota is 50 KB. Because the difference is less than or equal to the default quota size of 50 KB, PPS 34 authorizes a smaller 40 KB quota and at time H transmits to PDSN 18*b* an Accounting-Response message having a Quota Update attribute specifying a PPVQ of 140 KB (the cumulative quota) and a PPVT of 130K (the cumulative threshold).

As shown at time M, IP data flow between mobile station 14 and terminating station 36 continues. As shown in FIG. 2B, the IP data flow continues until PPC 22*b* of PDSN 18*b* detects that the PPVT of 130 KB is reached at time N. In response to detecting that the 130 KB PPVT has been reached at time N, PDSN 18*b* sends an Accounting-Request message to PPS 34 at time O, informing PPS 34 that 130 KB of traffic has been detected with an Quota Update attribute specifying PPVQ=130 KB. In response to receipt of the Accounting-Request message, PPS 34 saves 130 KB as the Balance Consumed and determines that the difference between the Account Balance and Authorized Quota is 10 KB. Accordingly, PPS 34 authorizes an additional 10 KB quota and at time P transmits to PDSN 18*b* an Accounting-Response message having a Quota Update attribute specifying a PPVQ of 150 KB (the cumulative quota) and a PPVT of 145 KB (the cumulative threshold).

As shown at time Q, IP data flow between mobile station 14 and terminating station 36 continues. The IP data flow continues until PPC 22*b* of PDSN 18*b* detects that the PPVT of 145 KB is reached at time R. In response to detecting that the 145 KB PPVT has been reached at time R, PDSN 18*b* sends an Accounting-Request message to PPS 34 at time S, informing PPS 34 that 145 KB of traffic has been detected with an Quota Update attribute specifying PPVQ=145 KB. In response to receipt of the Accounting-Request, PPS 34 saves 145 KB as the Balance Consumed and determines that the difference between the Account Balance and Authorized Quota is 5 KB. Accordingly, PPS 34 authorizes an additional 5 KB quota and at time T transmits to PDSN 18*b* an Accounting-Response having a Quota Update attribute specifying a PPVQ of 150 KB (the cumulative quota) and a PPVT of 150 KB (the cumulative threshold)

As shown at time U, IP data flow between mobile station 14 and terminating station 36 continues. The IP data flow continues until PPC 22*b* of PDSN 18*b* detects that the PPVT of 150 KB is reached at time V. In response to detecting that the 150 KB PPVT has been reached at time V, PDSN 18*b* sends an Accounting-Request (Stop) message to PPS 34 at time W, informing PPS 34 that 150 KB of traffic has been detected with an Quota Update attribute specifying PPVQ=150 KB. In response to receipt of the Accounting-Request (Stop) message, PPS 34 saves 150 KB as the Balance Consumed and determines that the difference between the Account Balance and Authorized Quota is 0 KB. Accordingly, PPS 34 sends an Accounting-Response message back to PDSN 18*b* to acknowledge termination of the packet data session.

Although FIGS. 2A-2B illustrate the termination of a prepaid packet data session upon exhaustion of the existing account balance, the prepaid packet data session need not terminate prior to or upon usage of the prepaid account balance. In some embodiments, the subscriber is notified of impending termination of the prepaid packet data session and can replenish the account balance through either out-of-band or in-band signaling prior to session termination. For example, PPS 34 can signal the subscriber out-of-band in response to allocation of a volume or duration quota equal to the threshold (see, e.g., the Accounting-Response message sent at time T). Alternatively, PPS 34 can request replenishment of the account balance via an attribute of a message, such as the Accounting-Responses sent at times T and X. In this in-band case, authorization to replenish the account balance can be given in an attribute of an Accounting-Request message. Moreover, in some embodiments or for selected subscribers, it may be desirable to switch accounting methodologies from prepaid to postpaid and allow the packet data session to continue beyond the prepaid account balance (e.g., until a predetermined level of "overdraft" protection has been exhausted).

In addition, although volume-based prepaid accounting is employed in the exemplary communication scenario illustrated in FIGS. 2A-2B, it should be understood that time-based prepaid accounting can be implemented in the same manner. In particular, for time-based embodiments, the Quota Update specifies a time-based PrePaid Duration Quota (PPDQ) and PrePaid Duration Threshold (PPDT) rather than a PPVQ and PPVT, and the PPC measures session duration rather than, or in addition to, data volume.

As indicated above, PPS 34 may assign any of a number of network access devices to be the PPC for a particular prepaid packet data session. Factors considered by PPS 34 in selecting a PPC may include, for example: (1) the level of prepaid service (e.g., Simple IP or Mobile IP), (2) type of quota (e.g., volume or duration), and (3) load balancing and performance considerations. In general, it is preferable to select PPC 22a of HA 20a as the PPC for Mobile IP prepaid packet data sessions because accounting information need not be transferred between PDSNs 18 in the event of a mobility event causing the packet data session to be handled by a different PDSN 18.

If HA 20a supports a PPC, HA 20a sends an Access-Request message to the HAAA/PPS 32 in response to receiving a Mobile IP Registration Request (MIP RRQ) from mobile station 14. The Access-Request contains the PrePaid Capability attribute and optionally the Mobile Node-Home Agent Security Parameter Index (MN-HA SPI) and/or Challenge-Handshake Authentication Protocol (CHAP) password. PPS 34 determines if the PPC 22a of HA 20a should be used and, if so, responds to HA 20a via HAAA 24a with an Access-Accept containing the PrePaid Capability attribute confirming the role of HA 20a as the PPC. HA 20a responds to the MIP RRQ from the mobile station with a success code and sends an Accounting-Request to HAAA/PPS 32.

During the packet data session illustrated in FIGS. 2A-2B, mobile station 14 may move between cells within visited access provider network 12b or even between access provider networks. If mobile station 14 moves among cells served by the same PDSN 18, the handoff of the session between cells is transparent to PPS 34, and PPS 34 need not be informed. If, however, mobile station 14 moves to a cell supported by a different PDSN 18, PPS 34 is informed of the inter-PDSN mobility event, for example, by receipt of an Access-Request message for the same subscriber and mobile station ID originating from a new PDSN 18 without receiving an Accounting-Stop message from the old PDSN 18. In response to receiving notification of the inter-PDSN mobility event, PPS 34 preferably transmits a Disconnect-Request to the old PDSN 18 via FAAA 24b, requesting that the old PDSN 18 release all resource associated with the session (e.g., the unused quota). The old PDSN 18 preferably responds to the Disconnect-Request with a Disconnect-Acknowledge, which is sent to FAAA 24b and then forwarded to PPS 34. Optionally, the Disconnect Acknowledge may have an appended Quota update attribute informing PPS 34 what portion of the last Quota was consumed prior to the inter-PDSN mobility event.

With reference now to FIG. 3, there is depicted an exemplary embodiment of a RADIUS PrePaid Capability VSA in accordance with the present invention. In a typical implementation the RADIUS PrePaid Capability VSA is appended to an Access-Request message to indicate prepaid capability, as described above with reference to FIGS. 2A-2B. As illustrated, the PrePaid Capability VSA includes a number of fields, including the Vendor-Value field. For messages to the PPS, the Vendor-Value field indicates whether the sending device supports prepaid packet data sessions, and, for messages from the PPS, the Vendor-Value field indicates whether or not the sending device is confirmed as the PPC for the session. Exemplary values and associated meanings of the Vendor-Value field are summarized below in Table I.

TABLE I

| Value | Meaning |
| --- | --- |
| 1 | device supports volume-based prepaid accounting |
| 2 | device supports time-based prepaid accounting |
| 3 | device supports both volume-based and time-based accounting |
| 4 | PPS will allocate a device other than sender of access request as PPC for session |
| 5 | PPS confirms sender of access request as PPC for session |

Referring now to FIG. 4, there is illustrated an exemplary RADIUS Quota Update VSA in accordance with the present invention. The RADIUS Quota Update VSA may be appended to Accounting-Requests and Accounting-Responses to communicate prepaid Quota and Threshold information, as described above with reference to FIGS. 2A-2B. As shown, the Quota Update VSA included a number of fields for which exemplary values and associated meanings are summarized below in Table II.

TABLE II

| Field | Value | Meaning |
| --- | --- | --- |
| Subtype | 1 | Identifies Quota ID field |
|  | 2 | Identifies Volume Quota Threshold field |
|  | 3 | Identifies Volume Quota field |
|  | 4 | Identifies Duration Quota Threshold field |
|  | 5 | Identifies Duration Quota field |
| Quota-ID | — | Two-byte integer that uniquely identifies the Quota |
| Volume Threshold Octets | — | Threshold for both Forward and Reverse Link Octets |
| Allocated Volume Quota Octets | — | Total octets allocated to or used by the subscriber on forward and reverse links |
| Duration Threshold | — | Threshold for total duration in seconds |
| Allocated Duration Quota | — | Total duration in seconds allocated to or used by the prepaid subscriber |

In the illustrated RADIUS Quota Update VSA, not all Subtype fields will appear in each Quota Update VSA. In particular, because time-based and volume-based accounting are not both utilized for the same session in a preferred embodiment, the RADIUS Quota Update VSA will typically include either Volume Quota and Volume Quota Threshold fields or Duration Quota and Duration Quota Threshold fields, but not both.

With reference now to FIGS. 5-7, in accordance with a preferred embodiment of the present invention, existing RADIUS Remote Address Accounting attributes are also augmented to support prepaid packet data service. In particular, as shown in FIGS. 5-7, respectively, the RADIUS Remote Address Table Index, Remote IPv4 Address, and Remote IPv6 Address attributes, which may be appended, for example, to an Access-Response message such as illustrated in FIG. 2A at time B2, are augmented to include a Qualifier field that by which the PPS indicates to the PPC for a packet data session that data to and from the destination stations referenced by the attributes are exempt from prepaid charges. Accordingly, the PPC does not include the byte count (or session duration) attributable to IP packets communicated with the identified destination stations in the totals reported to the PPS.

As has been described, the present invention provides prepaid packet data service utilizing a client-server architecture. By allocating only a portion of a prepaid subscriber's account balance at a time, the present invention efficiently regulates utilization of network resources, promoting achievement of Quality of Service (QoS) and other network resource management objectives.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For example, although aspects of the present invention have been described with respect to various devices executing software that directs the functions of the present invention, it should be understood that present invention may alternatively be implemented as a program product. Programs defining the functions of the present invention can be delivered to a device, such as a server computer system or network device, via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

In addition, although the present invention has been described for illustrative purposes in the context of a data communication network including wireless access networks, it should be understood that the present invention is also applicable to embodiments in which at least one access network provides landline (e.g., fiber, cable, or PSTN) access. In such embodiments, the PPS is coupled to (or incorporated within) a service control point (SCP) of the landline access network rather than an HAAA.

Furthermore, although the present invention is described above with reference to a communication scenario in which the prepaid packet data session is initiated by the mobile station, it should be understood that a "collect" prepaid packet data session can alternatively be initiated by the destination station.

What is claimed is:

1. A non-transitory, computer accessible memory medium storing program instructions for accessing a prepaid communication service, said program instructions comprising a prepaid client, wherein said prepaid client is executable by a processor to:

transmit a first resource request for prepaid resources to a prepaid server, wherein the first resource request contains an attribute having a field settable to a first value to indicate support for data volume-based accounting, and to a second value to indicate support for time-based accounting;

receive a first resource response responsive to the first resource request from the prepaid server specifying a first quota of prepaid resources no greater than a prepaid account balance of a prepaid service subscriber and a resource usage threshold at which the prepaid client is required to provide notification, wherein the resource usage threshold is less than the first quota of prepaid services;

count an amount of prepaid resources consumed in a prepaid packet data session;

in response to determining that the resource usage threshold of prepaid resources has been reached but before the first quota of prepaid resources has been consumed, transmit a notification to the prepaid server indicating that the resource usage threshold of prepaid resources has been reached; and receive a second resource response, responsive to the notification, specifying a second quota of prepaid resources for said prepaid packet data session;

wherein the prepaid client is further executable to set the field in the attribute contained in the first resource request to a first value to indicate support for data volume-based prepaid accounting and set the field in the attribute contained in the first resource request to a second value to indicate support for time-based prepaid accounting.

2. The non-transitory, computer accessible memory medium of claim 1, said prepaid client executable to further:

in response to receipt of an access request from a mobile station, transmit an access-request message to the prepaid server requesting prepaid packet data service.

3. The non-transitory, computer accessible memory medium of claim 1, wherein said first quota is a cumulative quota including prepaid resources previously allocated in said prepaid packet data session and newly allocated prepaid resources, and wherein receiving said first resource response comprises receiving a first resource response specifying the cumulative quota.

4. The non-transitory, computer accessible memory medium of claim 1, wherein said resource usage threshold indicates an amount of said quota that can be consumed before the prepaid client provides notification to the prepaid server.

5. The non-transitory, computer accessible memory medium of claim 1, wherein the notification is an accounting interim request different from an accounting stop request, and wherein receiving the second resource response is in response to the accounting interim request.

6. A method of accessing a prepaid communication service, said method comprising:

a prepaid client transmitting a first resource request for prepaid resources to a prepaid server;

the prepaid client receiving a first resource response from the prepaid server specifying a first quota of prepaid resources no greater than a prepaid account balance of a prepaid service subscriber, the first resource response further specifying a resource usage threshold at which the prepaid client provides notification, wherein the resource usage threshold is less than the first quota of prepaid services;

the prepaid client counting an amount of prepaid resources consumed in a prepaid packet data session;

in response to determining that the resource usage threshold has been reached but before the first quota of prepaid resources has been consumed, the prepaid client transmitting a second resource request to the prepaid server for additional prepaid resources; and the prepaid client receiving a second resource response responsive to the second resource request, the second resource response specifying a second quota of prepaid resources for said prepaid packet data session, wherein the first resource request contains an attribute having a field, the method further comprising:

the prepaid client setting the field in the attribute contained in the first resource request to a first value to indicate support for data volume-based prepaid accounting; and the prepaid client setting the field in the attribute contained in the first resource request to a second value to indicate support for time-based prepaid accounting.

7. The method of claim 6, further comprising:

in response to receipt of an access request from a mobile station, the prepaid client transmitting an access-request message to the prepaid server requesting prepaid packet data service.

8. The method of claim 6, wherein said first quota is a cumulative quota including prepaid resources previously allocated in said prepaid packet data session and newly allocated prepaid resources, and wherein receiving said first resource response comprises receiving a resource response specifying the cumulative quota.

9. The method of claim 6, wherein the second resource response further specifies a second resource usage threshold, the method further comprising the prepaid client transmitting a message signaling termination of said prepaid packet data session in response to determining that the second resource usage threshold of prepaid services has been consumed and that the second resource usage threshold is equal to said second quota.

10. The method of claim 6, wherein the prepaid client receiving said first and second resource responses comprises a Packet Data-Serving Node receiving said first and second resource responses from a prepaid server associated with a Home Authentication, Authorization and Accounting (HAAA) server of a wireless access network.

11. The method of claim 6, further comprising:

the prepaid client setting the field in the attribute contained in the first resource request to a third value to indicate support for both time-based prepaid accounting and data volume-based prepaid accounting.

12. The method of claim 6, wherein the second resource request is an accounting interim request different from an accounting stop request, and wherein receiving the second resource response is in response to the accounting interim request.

13. A node comprising:

a computer; and a prepaid client for accessing a prepaid communication service, said prepaid client executable on the computer to:

transmit a first resource request for prepaid resources to a prepaid server;

receive a first resource response from the prepaid server specifying a first quota of prepaid resources no greater than a prepaid account balance of a prepaid service subscriber, the first resource response further specifying a resource usage threshold at which the prepaid client provides notification, wherein the resource usage threshold is less than the first quota of prepaid services;

count an amount of prepaid resources consumed in a prepaid packet data session;

responsive to determining that the resource usage threshold has been reached but before the first quota of prepaid resources has been consumed, transmit a second resource request to the prepaid server for additional prepaid resources; and receive a second resource response responsive to the second resource request, the second resource response specifying a second quota of prepaid resources for said prepaid packet data session, wherein the first resource request contains an attribute having a field, and wherein the prepaid client is executable on the computer to further:

set the field in the attribute contained in the first resource request to a first value to indicate support for data volume-based prepaid accounting;

set the field in the attribute contained in the first resource request to a second value to indicate support for time-based prepaid accounting.

14. The node of claim 13, wherein the prepaid client is executable on the computer to:

responsive to receipt of an access request from a mobile station, transmit an access-request message to the prepaid server requesting prepaid packet data service.

15. The node of claim 13, wherein said first quota is a cumulative quota including prepaid resources previously allocated in said prepaid packet data session and newly allocated prepaid resources, and wherein said first resource response specifies the cumulative quota.

16. The node of claim 13, wherein the second resource response further specifies a second resource usage threshold, wherein the prepaid client is executable on the computer to further transmit a message signaling termination of said prepaid packet data session in response to determining that the second resource usage threshold of prepaid services has been consumed and that the second resource usage threshold is equal to said second quota.

17. The node of claim 13, wherein the node comprises a Packet Data-Serving Node that receives said first and second resource responses from the prepaid server associated with a Home Authentication, Authorization and Accounting (HAAA) server of a wireless access network.

18. The node of claim 13, wherein the prepaid client is executable on the computer to further:

set the field in the attribute contained in the first resource request to a third value to indicate support for both time-based prepaid accounting and data volume-based prepaid accounting.

19. The node of claim 13, wherein the first resource request further specifies one or more destination stations that are exempt from prepaid charges.

20. The node of claim 13, wherein the prepaid client is executable on the computer to further:

receive from the prepaid server a request to replenish the prepaid account balance.

21. The node of claim 20, wherein the request to replenish is in one of the first resource response and second resource response.

* * * * *